United States Patent
Green et al.

(10) Patent No.: US 9,486,798 B2
(45) Date of Patent: Nov. 8, 2016

(54) METHOD FOR MAKING ANION EXCHANGE AND CHELANT RESINS INCLUDING ALIPHATIC AMINO FUNCTIONAL GROUPS

(71) Applicants: DOW GLOBAL TECHNOLOGIES LLC, Midland, MI (US); ROHM AND HAAS COMPANY, Philadelphia, PA (US)

(72) Inventors: George D. Green, Cary, IL (US); John C. Rohanna, Ambler, PA (US); Alfred K. Schultz, Maple Glen, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/384,101

(22) PCT Filed: Jun. 9, 2014

(86) PCT No.: PCT/US2014/041458
§ 371 (c)(1),
(2) Date: Sep. 9, 2014

(87) PCT Pub. No.: WO2014/204686
PCT Pub. Date: Dec. 24, 2014

(65) Prior Publication Data
US 2016/0236187 A1 Aug. 18, 2016

Related U.S. Application Data

(60) Provisional application No. 61/836,769, filed on Jun. 19, 2013.

(51) Int. Cl.
*B01J 41/14* (2006.01)
*B01J 41/04* (2006.01)
*B01J 45/00* (2006.01)
*C08F 8/30* (2006.01)

(52) U.S. Cl.
CPC ............... *B01J 41/14* (2013.01); *B01J 41/043* (2013.01); *B01J 41/046* (2013.01); *B01J 45/00* (2013.01); *C08F 8/30* (2013.01)

(58) Field of Classification Search
CPC ...... B01J 41/14; B01J 41/043; B01J 41/046; B01J 45/00; C08F 8/30
USPC .......................................................... 521/32
See application file for complete search history.

(56) References Cited

U.S. PATENT DOCUMENTS

| 4,895,905 A | 1/1990 | Schneider et al. |
| 4,952,608 A | 8/1990 | Klipper et al. |
| 5,134,169 A | 7/1992 | Green et al. |
| 6,329,435 B1 | 12/2001 | Klipper et al. |
| 6,756,462 B2 | 6/2004 | Pafford et al. |
| 6,924,317 B2 | 8/2005 | Feistel et al. |
| 7,282,153 B2 | 10/2007 | Barrett et al. |
| 8,163,138 B2 | 4/2012 | Harris et al. |
| 8,273,799 B2 | 9/2012 | Harris et al. |
| 2010/0210743 A1* | 8/2010 | Harris ............... B01J 41/14 521/30 |

OTHER PUBLICATIONS

R. I. Khusnutdinov et al. "Manganese Compounds in the Catalysis of Organic Reaction", Russian Journal of Organic Chemistry, 2012, vol. 48, No. 3, pp. 309-348.*
Kurz et al., Nitromethylation of Aromatic Hydrocarbons with Nitromethane-Manganese (III) Acetate, J.C.S. Chem. Comm. ,(1976), 968-969.
Kurz et al, Nitroalkylation of Aromatic Hydrocarbons Promoted by Manganese (III) Acetate, J. Org. Chem (1981), 46, 4668-4672.
Bellamy, Nitromethylation of Benzene Using Electrochemically Generated Manganese (III), Acta Chemica Scandinavica B 33 (1979), 208-212.
Khusnutdinov et al., Manganese Compounds in the Catalysis of Organic Reactions, Russian Journal of Organic Chemistry, 2012, vol. 48, No. 3, pp. 309-348.
Zikos, et al, Lewis acid-nitromethane complex-promoted Friedel-Crafts reactions of PS-DVB-resins, tetrahedron Letters 47 (2006) 8711-8715.

* cited by examiner

*Primary Examiner* — Michael M Bernshteyn

(57) ABSTRACT

A method for making an anion exchange or chelant resin comprising a vinyl aromatic polymer including a repeating unit comprising an aromatic ring substituted with an aliphatic amino group, wherein the method comprises the step of reacting a vinyl aromatic polymer with a nitro compound comprising from 1 to 12 carbon atoms with the proviso that the α carbon includes at least one hydrogen.

7 Claims, No Drawings

METHOD FOR MAKING ANION EXCHANGE AND CHELANT RESINS INCLUDING ALIPHATIC AMINO FUNCTIONAL GROUPS

FIELD

The invention generally relates to methods for making anion exchange and chelant resins including amination of vinyl aromatic copolymers.

INTRODUCTION

For at least sixty years anion exchange and chelant resins have been produced by a multi-step process including the chloromethylation of a vinyl aromatic polymer followed by amination. See for example: U.S. Pat. No. 5,134,169, U.S. Pat. No. 6,756,462, U.S. Pat. No. 6,924,317, U.S. Pat. No. 7,282,153 and U.S. Pat. No. 8,273,799. The initial step of chloromethylation involves reacting vinyl aromatic polymers with a chloromethylation reagent in the presence of a catalyst at elevated temperature. One of the most common chloromethylation reagents is chloromethyl methyl ether (CMME)—a known carcinogen that requires special handling. The process of chloromethylation generates a waste stream containing volatile organics that additionally requires special handling. See for example U.S. Pat. No. 8,163,138. Given the challenges and costs associated with chloromethylation, there is a long felt need for alternative, industrially viable routes for aminating vinyl aromatic polymers without the step of chloromethylation. One such technique is described in U.S. Pat. No. 4,952,608 and U.S. Pat. No. 6,329,435 whereby a vinyl aromatic polymer is aminated by reaction with hydroxymethylphthalimide under acidic conditions followed by hydrolysis. Additional routes are still desired.

SUMMARY

In one embodiment the invention includes a method for making an anion exchange or chelant resin comprising the steps of: i) reacting a vinyl aromatic polymer with a nitro compound to form a polymer having a repeating unit comprising an aromatic ring substituted with a nitro group, and ii) reducing the nitro group to form an aliphatic amino group. The nitro compound preferably comprises from 1 to 12 carbon atoms with the proviso that the alpha (a) carbon includes at least one hydrogen. In a preferred embodiment, the nitro compound is a nitroalkane having from 1 to 12 carbon atoms. Many additional embodiments are described. The resins made by the subject method find utility in a variety of applications including water demineralization and mining.

DETAILED DESCRIPTION

The invention includes methods for making anion exchange resins (including both weak and strong base resins) and chelant resins. In a preferred embodiment, the method includes the steps of: i) reacting a vinyl aromatic polymer with a nitro compound to form a polymer having a repeating unit comprising an aromatic ring substituted with a nitro group, and ii) reducing the nitro group to form an aliphatic amino group. The nitro compound preferably comprises from 1 to 12 carbon atoms with the proviso that the alpha (a) carbon includes at least one hydrogen. In a preferred embodiment, the nitro compound is a nitroalkane having from 1 to 12 carbon atoms. A representative reaction scheme is provided below.

Reaction Scheme:

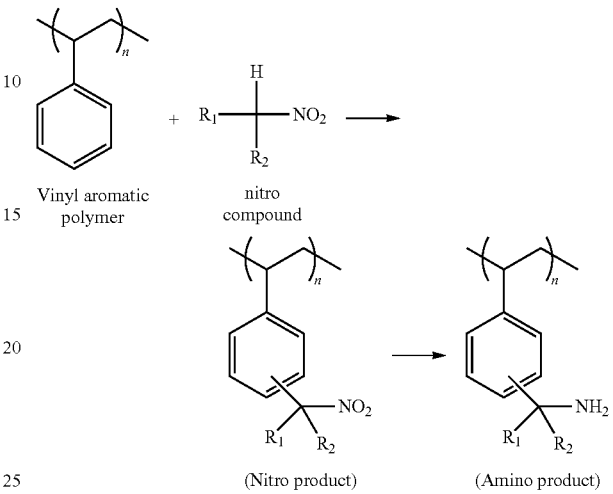

wherein $R_1$ and $R_2$ are independently selected from hydrogen or a carbon containing moiety (hydrocarbon) having from 1 to 12 carbon atoms, e.g. aliphatic and aromatic hydrocarbon groups. As shown, the vinyl aromatic polymer includes a repeating unit including an aromatic group, which upon reaction with the nitro compound becomes substituted with a nitro functional group (Nitro product) and which upon subsequent reduction, becomes an aliphatic amino group located at the meta, ortho or para position on the aromatic ring (Amino product). Preferred nitro compounds include nitroalkanes, e.g. nitromethane, nitroethane, 1-nitropropane and 2-nitropropane. In other embodiments, "$R_1$ and $R_2$" may include a carbon containing moiety including unsaturated hydrocarbons, e.g. vinyl groups, aromatic groups, etc.

The term "vinyl aromatic polymers" refers to a class of polymers sometimes also referred to in the art as "poly (vinylaromatic) polymers." For purposes of the present description, the term "vinyl aromatic polymers" refers to polymers derived from monovinylidene monomers and a crosslinking monomer. Such vinyl aromatic polymers may be prepared using well known polymerization techniques such as single-stage polymerization processes as described in F. Helfferich, Ion Exchange (McGraw-T 1962), pg 35-36, wherein a single monomer mixture is suspension polymerized to produce copolymer beads; or "seeded" or multistaged polymerization processes such as described in U.S. Pat. Nos. 4,419,245 and 4,564,644. Suitable monovinylidene monomers are well-known and reference is made to Polymer Processes, edited by Calvin E. Schildknecht, published in 1956 by Interscience Publishers, Inc., New York, Chapter III, "Polymerization in Suspension" at pp. 69-109. Table TI (pp. 78-81) of Schildknecht describes many types of monovinylidene monomers which are suitable in practicing the present invention. Of the monomers listed, water-insoluble monovinylidene monomers including the monovinylidene aromatics such as styrene and substituted styrene are preferred. The term "substituted styrene" includes substituents of either/or both the vinylidene group and phenyl group of styrene and include: vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo or chlorostyrene and vinylbenzylchloride. Other applicable monomers include monovinylidene non-styrenics such as: esters of α,β-ethylenically unsaturated carboxylic acids, particularly acrylic or methacrylic acid, methyl methacrylate, isobornylmethacrylate, ethylacrylate, and butadiene, ethylene, propylene, acrylonitrile, and vinyl chloride; and mixtures of one or more of said monomers. Preferred monovinylidene monomers include styrene and substituted styrene such as ethylvinylbenzene. The term "monovinylidene monomer" is intended to include homogeneous monomer mixtures and mixtures of different types of monomers, e.g. styrene and isobornylmethacrylate. Examples of suitable crosslinking monomers (i.e., polyvinylidene compounds) include polyvinylidene aromatics such as divinylbenzene, divinyltoluene, divinylxylene, divinylnaphthalene, trivinylbenzene, di(vinyl)(diphenyl) ether, di(vinyl)(diphenyl) sulfone, as well as diverse alkylene diacrylates and alkylene dimethacrylates. Preferred crosslinking monomers are divinylbenzene, trivinylbenzene, and ethylene glycol dimethacrylate. The terms "crosslinking agent," "crosslinker" and "crosslinking monomer" are used herein as synonyms and are intended to include both a single species of crosslinking agent along with combinations of different types of crosslinking agents.

The subject vinyl aromatic polymers are typically prepared from monomer mixtures comprising greater than 50 molar percent, and preferably greater than 75 molar percent of: styrene, substituted styrene or a combination thereof; with styrene and ethylvinylbenzene being preferred. Stated another way, the resulting vinyl aromatic polymer has a styrenic content greater than 50 molar percent, and more preferably greater than 75 molar percent (based upon the total molar content). The term "styrenic content" refers to the quantity of monovinylidene monomer units of styrene and/or substituted styrene utilized to form the polymer. The monomer mixture further includes a suitable amount of crosslinker monomer which is typically from 0.01 to 20 molar percent but preferably from 1 to 15 molar percent of the total monomer mixture.

Another class of applicable vinyl aromatic polymers include interpenetrating polymer networks (IPN). The term "interpenetrating polymer network" is intended to describe a material containing at least two polymers, each in network form wherein at least one of the polymers is synthesized and/or crosslinked in the presence of the other. The polymer networks are physically entangled with each other and in some embodiments may be also be covalently bonded. Characteristically, IPNs swell but do not dissolve in solvent nor flow when heated. Ion exchange resins including IPNs have been commercially available for many years and may be prepared by known techniques involving the preparation of multiple polymer components. Examples of such resins along with techniques for their preparation are provided in: U.S. Pat. No. 4,419,245, U.S. Pat. No. 4,564,644, U.S. Pat. No. 4,582,859, U.S. Pat. No. 5,834,524, U.S. Pat. No. 6,251,996, U.S. Pat. No. 6,924,317 and US 2002/0042450. As used herein, the term "polymer component" refers to the polymeric material resulting from a distinct polymerization step. For example, in a preferred embodiment of the present invention, the subject IPN ion exchange resins are "seeded" resins; that is, the resin is formed via a seeded process wherein a polymer (preferably crosslinked) seed is first formed and is subsequently imbibed with monomer and subsequently polymerized. Additional monomer may be subsequently added during the polymerization process (i.e. "continuous addition" or "con-add"). The formation of the seed particles constitutes a distinct polymer component. Similarly, the process step of imbibing and polymerizing a monomer mixture into the seed constitutes yet another polymer component. If used, the subsequent continuous addition of a monomer mixture commonly used to "grow up" the seed also constitutes a distinct polymer component. Except as specifically described herein, the constituents of each polymer component may be the same or different. Moreover, the monomer mixture used during a polymerization step need not be homogeneous; that is, the ratio and type of monomers may be varied. The term "polymer component" is not intended to mean that the resulting resin have any particular morphology other than an interpenetrating polymer network; however, the resins may have a "core-shell" type structure as is described in US Re34112. Each polymer component of the present invention preferably contributes more than about 5 weight percent, and more preferably at least 10 weight percent of the final IPN polymer particle. Typically, the resins comprise two or three polymer components, e.g. a seed component, an imbibe component, and/or a continuous addition component. Those skilled in the art will appreciate that different or additional combinations of polymer components may be used, e.g., multiple con-add components may be utilized. The first, second, third, etc., polymer components do not necessarily correspond to an order of addition. That is, the "first polymer component" does not necessarily correspond to the polymer component which is first polymerized, e.g., a seed particle. The terms "first," "second," etc. are only used to distinguish one component from another, not to designate an order of addition.

As previously indicated, the polymers of the present invention may be made by way of a seeded polymerization. Seeded polymerizations, also known as continuous or semi-continuous staged polymerizations, are generally described in U.S. Pat. No. 4,419,245, U.S. Pat. No. 4,564,644, and U.S. Pat. No. 5,244,926. Other suitable polymerization methods are described in U.S. Pat. No. 4,444,961, U.S. Pat. No. 4,623,706, U.S. Pat. No. 4,666,673, and U.S. Pat. No. 5,244,926. While the crosslinked polymer may be macroporous or gel-type, gel-type polymers are preferred. The terms "gel-type" and "macroporous" are well-known in the art and generally describe the nature of the polymer particle porosity. The term "macroporous" as commonly used in the art means that the polymer has both macropores and mesopores. The terms "microporous," "gellular," "gel" and "gel-type" are synonyms that describe polymer particles having pore sizes less than about 20 Angstroms (Å), while macroporous polymer particles have both mesopores of from about 20 Å to about 500 Å and macropores of greater than about 500 Å. Gel-type and macroporous polymer particles, as well as their preparation are further described in U.S. Pat. No. 4,256,840 and U.S. Pat. No. 5,244,926. The finished polymer particles preferably have a bead structure with a median particle diameter from 150 to 800 microns. The crosslinked polymer particles may have a Gaussian particle size distribution or a relatively uniform particle size distribution, i.e. "monodisperse" that is, at least 90 volume percent of the beads have a particle diameter from about 0.9 to about 1.1 times the volume average particle diameter.

The reaction of the vinyl aromatic polymer and nitro compound is preferably conducted by combining the constituents in a stoichiometric ratio, (e.g. 15:1 to 1:1 molar ratio of the nitro compound to aromatic moieties present in the vinyl aromatic polymer). The combination is preferably refluxed in a suitable solvent for about 20 minutes up to 20 hours under an inert atmosphere (e.g. nitrogen) and mild temperature (e.g. from about 20° C. to 140° C.). Suitable solvents are capable of stabilizing radicals, e.g. acetic acid, nitroalkanes such as nitromethane, halogenated solvents such as methylene chloride and EDC. Acetic acid is a preferred solvent. The reaction may be optionally catalyzed by including a metal reagent preferably having a reduction potential of from 1.0 to 2.5V, e.g. $Mn^{+3}$ or $Ce^{+4}$. A preferred reagent is manganese (III) acetate. The reagent may then be separated (e.g. filtered) from the reaction mixture and electrochemically regenerated by anodic oxidation. This regeneration can also be achieved in-situ for the conversion of $Mn^{2+}$ to $Mn^{3+}$ via electrochemical routes leading to a process catalytic in $Mn^{3+}$. The use of manganese (III)-catalyzed nitroalkylation is generally described in connection with non-polymers in the following references: Kurz et al., Nitromethylation of Aromatic Hydrocarbons with Nitromethane-Manganese (III) Acetate, J.C.S. Chem. Comm., (1976), 968-969; Kurz et al, Nitroalkylation of Aromatic Hydrocarbons Promoted by Manganese (III) Acetate, J. Org. Chem (1981), 46, 4668-4672; and Bellamy, Nitromethylation of Benzene Using Electrochemically Generated Manganese (III), Acta Chemica Scandinavica B 33 (1979), 208-212.

EXAMPLES

Example 1

Manganese(III) acetate (10.0 mmol), styrene-DVB copolymer (2.0 mmol), acetic acid (10.0 mL), dichloromethane (5.0 mL) and a nitroalkane (one of the following: 1-nitropropane, 2-nitropropane, nitroethane, or nitromethane, 10.0 mL) may be refluxed together under nitrogen atmosphere with continuous stirring until manganese(II) acetate precipitates and the reaction mixture appears white. Water is added to the reaction mixture which is then filtered and washed with water (3×15.0 mL), and dried in vacuo. IR (neat) 3025, 2922, 2848, 1547 ($NO_2$ $v_{as}$), 1492, 1451, 1369 ($NO_2$ $v_s$) $cm^{-1}$.

The subsequent reduction of the nitro group (see Nitro product in the Reaction Scheme illustrated above) to form the Amino product may be conducted by combining the Nitro product with hydrogen gas under pressure (e.g. 2 to 25 kPa) at mild temperature (e.g. about 20° C. to 100° C.). The reaction may be catalyzed by including classic reduction reagents such as palladium, platinum and nickel. Catalyst modifiers such as sulfones, sulfoxides, sulfates, amines and polyamines may also be utilized. The reduction reaction is preferably conducted in a solvent such as water, alcohols, ethers or hydrocarbons. In another embodiment, the reduction of the nitro group to the amine may be performed using hydride transfer reagents. One example would be the use of lithium aluminum hydride in tetrahydrofuran solvent at a temperature of 0° C. to 60° C. for 1 to 6 hours. For example, to a mixture of nitroalkylated polystyrene-co-DVB (0.30 mmol in $NO_2$ groups) in THF (10.0 mL) may be slowly added LAH (1.0 mmol) at 0° C. The internal temperature of the reaction should be maintained below 20° C. The mixture is allowed to stir at room temperature for 4 hours. The reaction is then cooled to 0° C. and quenched by the slow addition of water (10.0 mL) followed by 50% saturated solution of NaOH (10.0 mL). The polymer beads may be filtered and washed with water (3×15.0 mL), and dried in vacuo. IR (neat) 3419 (NH str), 3025, 2920, 2848, 1601, 1493, 1451, 1366, 1003, 744 $cm^{-1}$ Example 2

Ceric ammonium nitrate (10.0 mmol), linear polystyrene or styrene-DVB copolymer (2.0 mmol), (10.0 mL), acetic acid (10.0 mL), dichloromethane (5.0 mL) and a nitroalkane (one of the following: 1-nitropropane, 2-nitropropane, nitroethane, or nitromethane, 10.0 mL) were refluxed together under nitrogen atmosphere with continuous stirring for 8 hours. Water is added and the reaction mixture which is then filtered and washed with water (3×15.0 mL), and dried in vacuo. IR (neat) 3025, 2922, 2848, 1547 (NO2 nas), 1492, 1451, 1369 (NO2 ns) cm−1.

Example 3

Manganese (II) acetate (1.47 g, 6 mmol) and LiBF4 (560 mg, 0.1 M) were added to a mixture of acetic acid (60 mL), nitromethane (50 mL), and linear polystyrene or styrene-DVB copolymer (2.0 mmol). The mixture was heated to 85° C. and electrolyzed at 10 V for 2.5 hours. Water is added and the reaction mixture which is then filtered and washed with water (3×15.0 mL), and dried in vacuo. IR (neat) 3025, 2922, 2848, 1547 (NO2 nas), 1492, 1451, 1369 (NO2 ns) cm−1.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. It will be understood that certain features and subcombinations are of utility and may be employed without reference to other features and sub-combinations. References to ranges of numerical values expressly include the end points of such ranges. It will be appreciated that the vinyl aromatic polymers described herein may be further functionalized beyond the amination reaction described herein.

The invention claimed is:
1. A method for making an anion exchange or chelant resin comprising the steps of:
   i) reacting a vinyl aromatic polymer with a nitro compound in the presence of a metal reagent to form a polymer having a repeating unit comprising an aromatic ring substituted with a nitro group, wherein the nitro compound comprises from 1 to 12 carbon atoms with the proviso that the α carbon includes at least one hydrogen, and
   ii) reducing the nitro group to form an aliphatic amino group.
2. The method of claim 1 wherein the nitro compound is a nitroalkane.
3. The method of claim 1 wherein the nitro compound is selected from at least one of: nitromethane, nitroethane, 1-nitropropane and 2-nitropropane.
4. The method of claim 1 wherein the reaction between the vinyl aromatic polymer and nitro compound is conducted in the presence of a metal reagent having a reduction potential of from 1.0 to 2.5 V.
5. The method of claim 1 wherein the reaction between the vinyl aromatic polymer and nitro compound is conducted in the presence of a metal reagent selected from at least one of: $Mn^{+3}$ and $Ce^{+4}$.

6. The method of claim 1 wherein the metal reagent is electrochemically regenerated by anodic oxidation.

7. The method of claim 1 where the vinyl aromatic polymer comprises a polymer derived from a reaction mixture comprising styrene and divinylbenzene.

\* \* \* \* \*